US012590513B2

(12) United States Patent
Yun et al.

(10) Patent No.: US 12,590,513 B2
(45) Date of Patent: Mar. 31, 2026

(54) SAND SCREEN WITH A NON-WOVEN FIBER POLYMER FILTER

(71) Applicant: Schlumberger Technology Corporation, Sugar Land, TX (US)

(72) Inventors: Jushik Yun, Rosharon, TX (US); Scott Malone, Houston, TX (US); Xiaohong Ren, Rosharon, TX (US); Paarth Thapar, Rosharon, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/715,980

(22) PCT Filed: Dec. 13, 2022

(86) PCT No.: PCT/US2022/052665
§ 371 (c)(1),
(2) Date: Jun. 3, 2024

(87) PCT Pub. No.: WO2023/114186
PCT Pub. Date: Jun. 22, 2023

(65) Prior Publication Data
US 2025/0043662 A1 Feb. 6, 2025

Related U.S. Application Data

(60) Provisional application No. 63/290,796, filed on Dec. 17, 2021.

(51) Int. Cl.
*E21B 43/08* (2006.01)
*B01D 39/16* (2006.01)
*E21B 43/10* (2006.01)

(52) U.S. Cl.
CPC ........ *E21B 43/082* (2013.01); *B01D 39/1623* (2013.01); *E21B 43/108* (2013.01); *E21B 43/10* (2013.01)

(58) Field of Classification Search
CPC ............................ E21B 43/082; E21B 43/108
See application file for complete search history.

(56) References Cited

U.S. PATENT DOCUMENTS 6,352,111 B1 * 3/2002 Bode ...................... B01D 29/15
                                                        166/227
7,143,832 B2 * 12/2006 Freyer ................... E21B 43/103
                                                        166/387

(Continued)

FOREIGN PATENT DOCUMENTS

CN        112647903 A     4/2021
CN        110295868 B     12/2021

OTHER PUBLICATIONS

International Search Report and Written Opinion issued May 3, 2023 in PCT Application No. PCT/US2022/052665.

*Primary Examiner* — Tara Schimpf
*Assistant Examiner* — Daniel T Craig
(74) *Attorney, Agent, or Firm* — Jeffrey D. Frantz

(57) ABSTRACT

A sand screen for use within a wellbore. The sand screen may include a non-woven fiber polymer filter and a mechanical retainer. The non-woven fiber polymer filter may have a compressed state and an expanded state. The mechanical retainer may retain the non-woven fiber polymer filter in the compressed state. The non-woven fiber polymer filter may be expandable after exposure to a wellbore condition.

20 Claims, 4 Drawing Sheets

(56) References Cited

U.S. PATENT DOCUMENTS

| | | | |
|---|---|---|---|
| 7,828,055 | B2 | 11/2010 | Willauer et al. |
| 7,926,565 | B2 | 4/2011 | Duan et al. |
| 8,048,348 | B2 | 11/2011 | Duan et al. |
| 8,365,833 | B2 | 2/2013 | Carrejo et al. |
| 8,783,349 | B2 | 7/2014 | Robisson et al. |
| 8,980,799 | B2 | 3/2015 | Agrawal et al. |
| 9,068,437 | B2 | 6/2015 | Carrejo et al. |
| 9,090,012 | B2 | 7/2015 | Mazyar et al. |
| 9,212,541 | B2 | 12/2015 | Richard et al. |
| 9,441,458 | B2 | 9/2016 | Carrejo et al. |
| 9,878,486 | B2 | 1/2018 | Liu et al. |
| 2004/0261994 | A1 | 12/2004 | Nguyen et al. |
| 2011/0036578 | A1* | 2/2011 | Coronado ............... E21B 43/12 |
| | | | 166/305.1 |
| 2013/0248454 | A1 | 9/2013 | Frisk et al. |
| 2020/0208494 | A1 | 7/2020 | Lowry |

* cited by examiner

200μm

SAND SCREEN WITH A NON-WOVEN FIBER POLYMER FILTER

CROSS-REFERENCE TO RELATED APPLICATIONS

This application is a National Stage entry of International Patent Application No. PCT/US2022/052665, filed on Dec. 13, 2022, which claims the benefit of and priority to U.S. Provisional Application No. 63/290,796 entitled "Smart Polymeric Non-Woven Conformable Sandscreen," filed Dec. 17, 2021, the disclosure of which is incorporated herein by reference in its entirety.

BACKGROUND

In many hydrocarbon wells, inflowing fluid passes through a sand screen which filters out particulates from the inflowing oil or gas. The sand screen prevents sand from entering the wellbore and reduces damage that may occur by erosion. Conventionally, sand screens are made with a metallic mesh material. Once the sand screen is placed into the wellbore, gravel packs are pumped to fill the annulus between the screen and the formation.

In other instances, some metallic sand screens are expandable and are expanded downhole after placement in the wellbore. The result is a reduction in the annulus between the screen and the formation. The expandable screens in many instances have a limited expansion ratio, and the ability of the expandable screen to conform to borehole irregularities may not be satisfactory. Further, the ability of the expandable sand screen to resist borehole collapse may be reduced. Conventional sand screens are rated to resist greater external pressure than expandable sand screens. Expandable sand screens resist less external pressure because of plastic deformation experienced by their metallic components.

Recently, self-conformable polymer screens have been developed by using thermoplastic urethane (TPU) and implementing a shape memory concept. The polymeric screen has an open cell structure, which has been compressed. The polymeric screen is then placed into a wellbore and expanded by controlling the glass transition temperature of the polymeric material by utilizing an activation fluid, such as acetyl acetone, for example. The activation fluid is difficult to handle at the well site because the flash point of the activation fluid is relatively low, and a special formulation of the fluid is required. Once in the borehole, the polymeric TPU foam material softens and tries to return to its original expanded shape.

The expansion outer diameter was designed to be higher than the borehole internal diameter, resulting in the TPU foam conforming to the entire length of an even irregularly shaped, e.g., open hole, borehole, which can circumvent the need to pump gravel slurry in a gravel packing operation. However, one of the disadvantages of the foam material used in these sand screens is the weak mechanical properties of these foams when expanded. The application is limited by the pressure and temperature rating. If an expanded foam fails during a downhole operation, well control may be lost. Further, screen collapse under wellbore pressure may lead to a loss of permeability and a stuck completion string in the wellbore, which may be difficult to repair or change.

SUMMARY

A sand screen for use within a wellbore according to one or more embodiments of the present disclosure includes a non-woven fiber polymer filter and a mechanical retainer. The non-woven fiber polymer filter has a compressed state and an expanded state. The mechanical retainer retains the non-woven fiber polymer filter in the compressed state. The non-woven fiber polymer filter is expandable after exposure to a wellbore condition.

A method of completing a well according to one or more embodiments of the present disclosure includes covering a base pipe with a sand screen comprising a compressed non-woven fiber polymer filter. The method also includes retaining the compressed woven fiber polymer filter in a compressed state via a mechanical retainer. The method further includes running the base pipe and non-woven fiber polymer filter to a location in a wellbore. The method also includes expanding the non-woven fiber polymer filter via exposure to a wellbore condition to conform the non-woven fiber polymer filter to a wall of the wellbore. The method further includes filtering fluids through the non-woven fiber polymer filter to the base pipe.

A completion assembly for use within a wellbore according to one or more embodiments of the present disclosure includes a base pipe and a sand screen positioned around the base pipe. The sand screen includes a non-woven fiber polymer filter and a mechanical retainer. The non-woven fiber polymer filter has a compressed state and an expanded state. The mechanical retainer retains the non-woven fiber polymer filter in the compressed state. The non-woven fiber polymer filter is expandable after exposure to a wellbore condition.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims: the terms "up" and "down," "upper" and "lower," "upwardly" and "downwardly," "upstream" and "downstream," "uphole" and "downhole," "above" and "below," and other like terms indicating relative positions above or below a given point or element are used in this description to more clearly describe some embodiments of the disclosure.

The present disclosure generally relates to making and using a non-woven fiber polymer for sand control applications. More specifically, one or more embodiments of the present disclosure relate to a non-woven fiber polymer that is able to expand to an expanded state from a compacted or compressed state once deployed downhole to conform to an irregularly shaped wellbore for sand control operations. Without the need for additional activation fluids, the non-woven fiber polymer according to one or more embodiments of the present disclosure is much safer than conventional TPU materials. Moreover, the non-woven fiber polymer according to one or more embodiments of the present disclosure also provides excellent thermal stability allowing it to be used at much higher temperatures, up to at least 130° C. for example, for long-term applications. In contrast, conventional TPU materials are only operable up to 85° C. As further described below, the non-woven fiber polymer according to one or more embodiments of the present disclosure exhibits permeability, robustness, and an expansion ratio that are favorable for sand control operations.

Figure 1:
FIG. 1 is a sectional view of a sand screen positioned in a wellbore according to one or more embodiments of the present disclosure.

Referring now to FIG. 1, FIG. 1 is a sectional view of a completion assembly positioned in a wellbore according to one or more embodiments of the present disclosure. Specifically, the wellbore 100 includes an open bore hole 102, a production tubing string 104, which may be a base pipe according to one or more embodiments, and a sand screen 106. While wellbore 100 is illustrated as being a substantially vertical, uncased well, it should be recognized that the subject disclosure is equally applicable for use in cased wellbores as well as in horizontal and/or inclined wellbores. The sand screen 106 includes a filter member 108 and a non-woven fiber polymer filter 110, as described in more detail below, according to one or more embodiments of the present disclosure. The sand screen 106 is shown positioned in the wellbore 100 adjacent a producing formation 114. According to one or more embodiments of the present disclosure, the non-woven fiber polymer filter 110 may be the only filtration agent without the use of any filter member 108. In one or more embodiments of the present disclosure, the filter member 108 can be configured for structural support of the non-woven fiber polymer filter 110.

In a well completion method according to one or more embodiments of the present disclosure, a base pipe 104 is be covered with the non-woven fiber polymer filter 110 according to one or more embodiments of the present disclosure. The non-woven fiber polymer filter 110 covering the base pipe 104 is be compressed to a compressed state with a mechanical retainer before running the base pipe 104 to a location in the wellbore 100. Upon exposure to a wellbore condition, the non-woven fiber polymer filter 110 covering the base pipe 104 may expand to an expanded state due to release or degradation of the mechanical retainer. As the non-woven fiber polymer filter 110 expands into and fills the annulus, the non-woven fiber polymer filter 110 conforms to a wall of the wellbore 100. Because the non-woven fiber polymer filter 110 is able to conform to the wellbore 100 wall in this way, the non-woven fiber polymer filter 110 is able to filter debris including sand from fluids from the producing formation 114 to the base pipe 104. In one or more embodiments, after the downhole operation is complete, the non-woven fiber polymer filter 110 may be detached from the base pipe 104, and the base pipe 104 may be lifted out of the wellbore 100.

Figure 2:
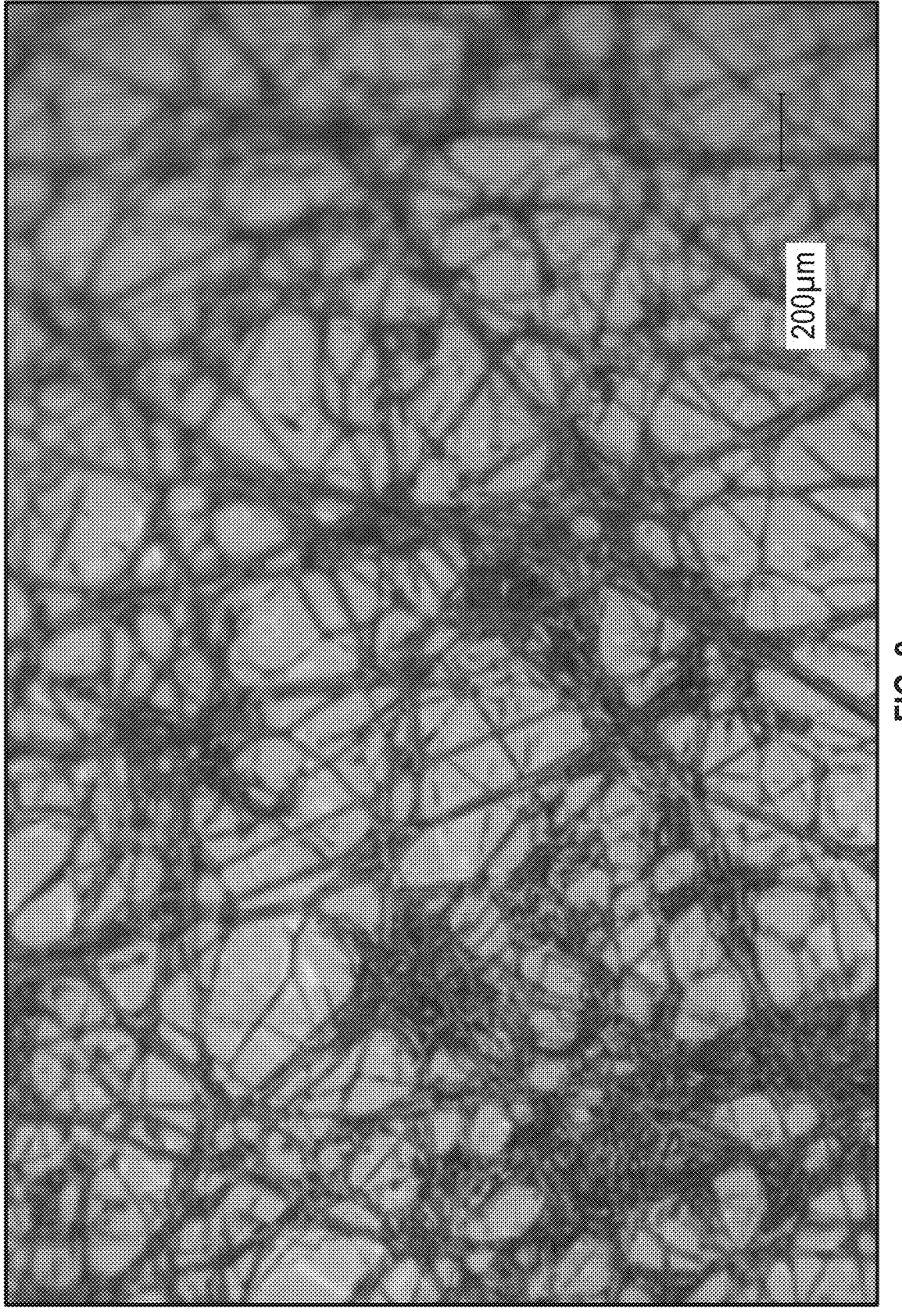
FIG. 2 is a magnified view of the non-woven fiber polymer filter of FIG. 1.

Turning now to FIG. 2, FIG. 2 shows a magnified view of the non-woven fiber polymer filter 110 of FIG. 1. The non-woven fiber polymer may include polypropylene ("PP"), a PP and polyethylene terephthalate ("PET") blend, a PP and polybutylene terephthalate ("PBT") blend, polyethylene, crosslinked polyethylene, nylon 6, nylon 11, or any combination thereof. The non-woven fiber polymer filter 110 may be manufactured by melt blown non-woven fiber polymer processing. Melt blown non-woven fibers are produced by extruding melt fibers through a spin net or die consisting of up to about 40 holes per inch to form long thin fibers, which are stretched and cooled by passing hot air over the fibers as they fall from the die. In one or more embodiments, the resultant web has a permeability of about 40 Darcy to about 60 Darcy. The resultant web is collected in to rolls, which are subsequently formed into a conformable filter around a mandrel or base pipe.

Figure 3:
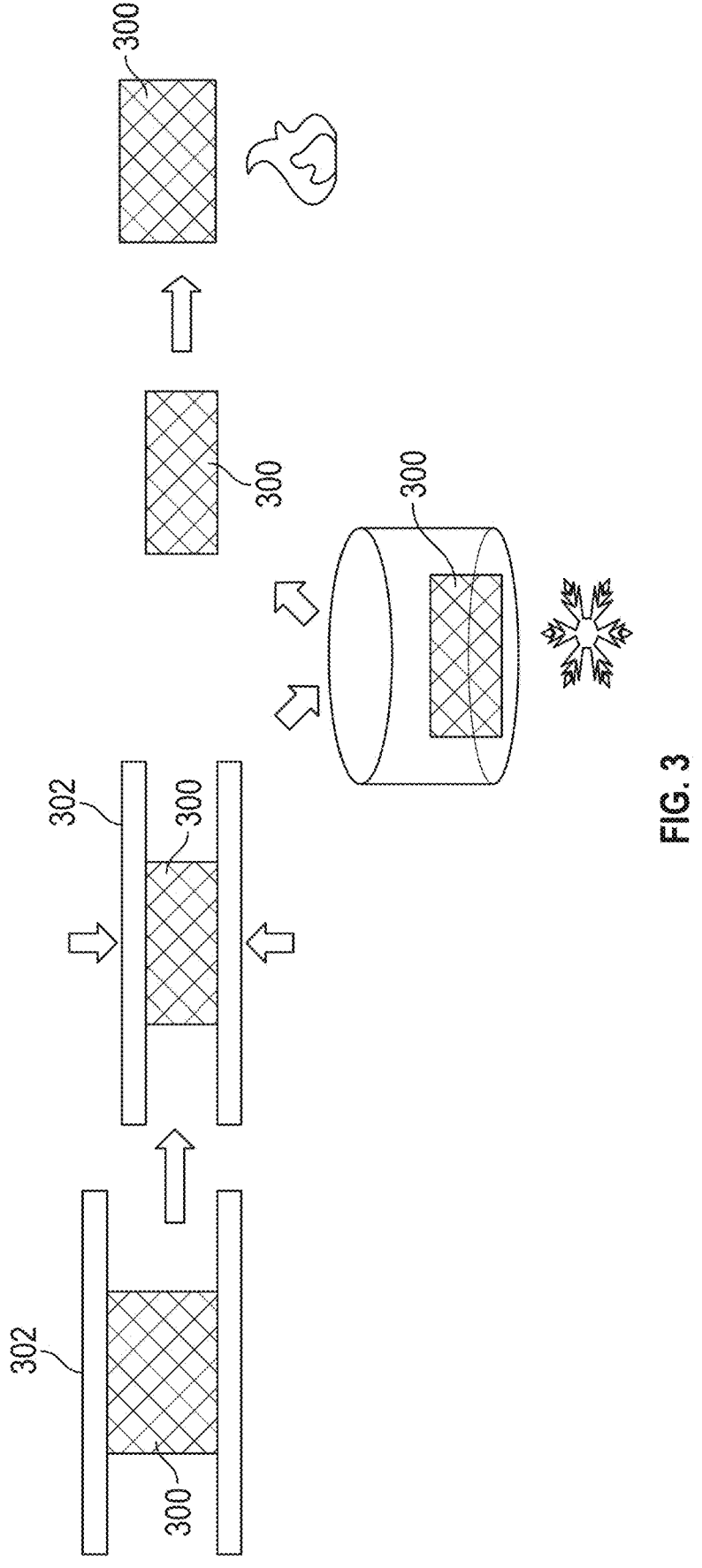
FIG. 3 is a schematic diagram of an expansion mechanism for the non-woven fiber polymer filter according to one or more embodiments of the present disclosure.

Referring now to FIG. 3, an expansion mechanism for the non-woven fiber polymer according to one or more embodiments of the present disclosure is shown. As previously described, one or more embodiments of the present disclosure are related to a non-woven fiber polymer that is able to expand from a compacted or compressed configuration once deployed downhole to conform to an irregularly shaped wellbore for sand control operations. For such applications, the ability of a sand screen made from a non-woven fiber polymer to expand once deployed downhole to conform to the wellbore is critical.

As shown in the expansion mechanism of FIG. 3, a non-woven fiber polymer filter 300 according to one or more embodiments of the present disclosure may be installed in a jig 302, and the non-woven fiber polymer filter 300 and the jig 302 may be heated to about 105° C. to soften the non-woven fiber polymer 300. Thereafter, the jig 302 may compress the non-woven fiber polymer filter 300 at about a 65% compression ratio, while the temperature is maintained at about 105° C. for about five days. Thereafter, the jig 302 may be removed, and the non-woven fiber polymer filter 300 may be quenched in chilled water or chilled air having a temperature between about -20° C. and 20° C.

Thereafter, the non-woven fiber polymer filter 300 may be removed from the chilled water or chilled air and allowed to warm up to room temperature. In one or more embodiments, the non-woven fiber polymer filter 300 is coated in a dissolvable polymer (e.g., a degradable polymeric wrapping tape) to prevent premature expansion of the non-woven fiber polymer filter 300. Thereafter, dissolvable polymer is dissolved or otherwise releases the non-woven fiber polymer filter 300 due exposure to a wellbore condition within the wellbore and the non-woven fiber polymer filter 300 may be heated up to 105° C., thereby expanding the non-woven fiber polymer filter 300.

Figure 4:
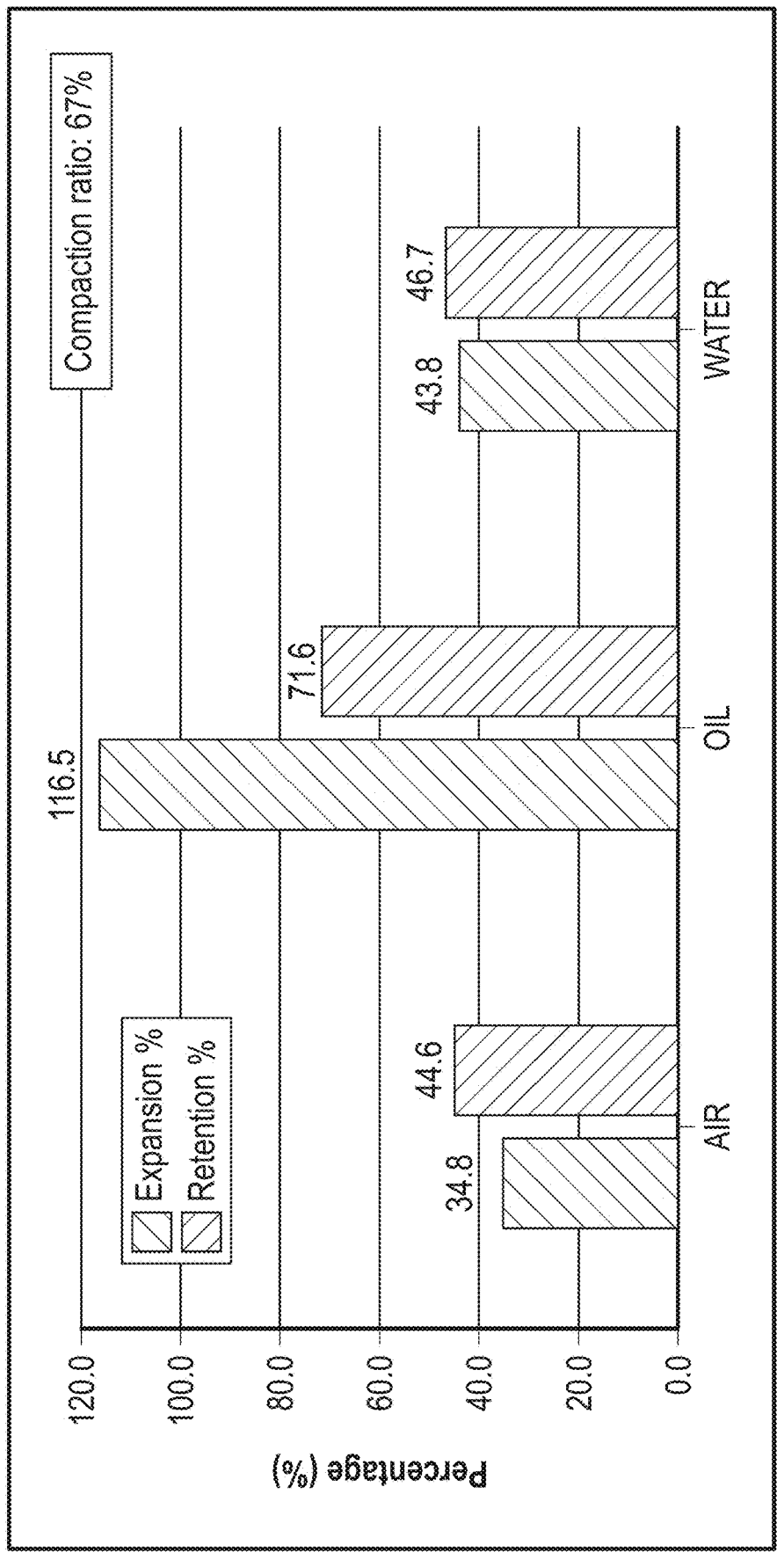
FIG. 4 shows the results of the expansion of the non-woven fiber polymer in different mediums according to one or more embodiments of the present disclosure.

Referring now to FIG. 4, FIG. 4 shows the results of the expansion of the non-woven fiber polymer filter 300 in different mediums according to one or more embodiments of the present disclosure. The results were determined via positioning initial samples (i.e., an as is button), in a compressed configuration, in different mediums (i.e., air, oil, and water) at 105° C. and allowing the samples to expand for twenty-four hours. The retention percentage shown in FIG. 4 was calculated as the final, expanded volume of a sample divided by the initial volume of the sample before compression. The expansion percentage shown in FIG. 4 was calculated as (the final, expanded volume of the sample minus the compacted volume of the sample) divided by the compacted volume of the sample.

FIG. 4 shows that the non-woven fiber polymer filter 300 has different expansion behavior from the compressed state to the expanded state in the different mediums, e.g., different wellbore media. For example, the expansion percentage of the non-woven fiber polymer filter 300 in oil may be greater than the expansion percentage of the non-woven fiber polymer filter 300 in water. In some embodiments, the expansion percentage of the non-woven fiber polymer filter 300 in oil may be greater than the expansion percentage of the non-woven fiber polymer filter 300 in water and greater than the expansion percentage of the non-woven fiber polymer filter 300 in air. In some embodiments, the expansion percentage of the non-woven fiber polymer filter 300 in water may be greater than the expansion percentage of the non-woven fiber polymer filter 300 in air. In the results of FIG. 4, the expansion percentage of the non-woven fiber polymer filter 300 in the different mediums is as follows: 116.5 in oil; 43.8 in water; and 34.8 in air. The retention percentage of the non-woven fiber polymer filter 300 in oil may be greater than the retention percentage of the non-woven fiber polymer filter 300 in water. In some embodiments, the retention percentage of the non-woven fiber polymer filter 300 in oil may be greater than the retention percentage of the non-woven fiber polymer filter 300 in water and greater than the retention percentage of the non-woven fiber polymer filter 300 in air. In some embodiments, the retention percentage of the non-woven fiber polymer filter 300 in water may be greater than the retention percentage of the non-woven fiber polymer filter 300 in air. In the results of FIG. 4, the retention percentage of the non-woven fiber polymer filter 300 in the different mediums is as follows: 71.6 in oil; 46.7 in water; and 44.6 in air.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 300 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A sand screen for use within a wellbore, the sand screen comprising:

a non-woven fiber polymer filter having a compressed state and an expanded state; and a mechanical retainer that retains the non-woven fiber polymer filter in the compressed state;

wherein the non-woven fiber polymer filter is expandable from the compressed state to the expanded state after exposure to a wellbore medium, and wherein the non-woven fiber polymer filter is configured to have different expansion behavior from the compressed state to the expanded state in different wellbore media, wherein an expansion percentage of the non-woven fiber polymer filter in oil is greater than an expansion percentage of the non-woven fiber polymer filter in water.

2. The sand screen of claim 1, wherein the mechanical retainer is a degradable polymeric wrapping tape.

3. The sand screen of claim 1, wherein the mechanical retainer is releasable from the non-woven fiber polymer filter via the wellbore medium.

4. The sand screen of claim 1, wherein the non-woven fiber polymer filter conforms to the wellbore in the expanded state.

5. The sand screen of claim 1, wherein the non-woven fiber polymer filter comprises a melt-blown non-woven fiber polymer.

6. The sand screen of claim 1, wherein the non-woven fiber polymer filter comprises at least one of polypropylene ("PP"), a PP and polyethylene terephthalate ("PET") blend, a PP and polybutylene terephthalate ("PBT") blend, polyethylene, crosslinked polyethylene, nylon 6, or nylon 11.

7. The sand screen of claim 1, wherein the non-woven fiber polymer filter has a permeability of about 40 Darcy to about 60 Darcy.

8. The sand screen of claim 1, wherein the expansion percentage of the non-woven fiber polymer filter in oil is greater than an expansion percentage of the non-woven fiber polymer filter in air.

9. The sand screen of claim 8, wherein the expansion percentage of the non-woven fiber polymer filter in water is greater than the expansion percentage of the non-woven fiber polymer filter in air.

10. The sand screen of claim 9, wherein:

the expansion percentage is calculated as a difference between a final expanded volume of the non-woven fiber polymer filter in the expanded state and a compacted volume of the non-woven fiber polymer filter in the compressed state, divided by the compacted volume, the non-woven fiber polymer filter is configured to have a retention percentage in oil that is greater than a retention percentage in water and greater than a retention percentage in air, the retention percentage of the non-woven fiber polymer filter in water is greater than the retention percentage of the non-woven fiber polymer filter in air, and the retention percentage is calculated as the final expanded volume of the non-woven fiber polymer filter in the expanded state divided by an initial, pre-compressed volume of the non-woven fiber polymer filter.

11. A method of completing a well, the method comprising:

covering a base pipe with a sand screen comprising a non-woven fiber polymer filter in a compressed state;

retaining the non-woven fiber polymer filter in the compressed state via a mechanical retainer;

running the base pipe and non-woven fiber polymer filter to a location in a wellbore;

expanding the non-woven fiber polymer filter via exposure to a wellbore medium to an expanded state that conforms the non-woven fiber polymer filter to a wall of the wellbore, wherein the non-woven fiber polymer filter is configured to have different expansion behavior from the compressed state to the expanded state in different wellbore media, wherein an expansion percentage of the non-woven fiber polymer filter in oil is greater than an expansion percentage of the non-woven fiber polymer filter in water; and filtering fluids through the non-woven fiber polymer filter to the base pipe.

12. The method of claim 11, wherein retaining the non-woven fiber polymer filter in the compressed state comprises retaining the non-woven fiber polymer filter in the compressed state via degradable polymeric wrapping tape.

13. The method of claim 11, wherein expanding the non-woven fiber polymer filter comprises dissolving the mechanical retainer or releasing the mechanical retainer.

14. A completion assembly for use within a wellbore, the completion assembly comprising:

a base pipe; and a sand screen positioned around the base pipe, the sand screen comprising:

a non-woven fiber polymer filter having a compressed state and an expanded state; and a mechanical retainer that retains the non-woven fiber polymer filter in the compressed state;

wherein the non-woven fiber polymer filter is expandable from the compressed state to the expanded state after exposure to a wellbore medium, and wherein the non-woven fiber polymer filter is configured to have different expansion behavior from the compressed state to the expanded state in different wellbore media, wherein an expansion percentage of the non-woven fiber polymer filter in oil is greater than an expansion percentage of the non-woven fiber polymer filter in water.

15. The completion assembly of claim 14, wherein the mechanical retainer is a degradable polymeric wrapping tape.

16. The completion assembly of claim 14, wherein the non-woven fiber polymer filter conforms to the wellbore in the expanded state.

17. The completion assembly of claim 14, wherein the non-woven fiber polymer filter comprises a melt-blown non-woven fiber polymer.

18. The completion assembly of claim 14, wherein the non-woven fiber polymer filter comprises at least one of PP, a PP and PET blend, a PP and PBT blend, polyethylene, crosslinked polyethylene, nylon 6, or nylon 11.

19. The completion assembly of claim 14, wherein the non-woven fiber polymer filter has a permeability of about 40 Darcy to about 60 Darcy.

20. The completion assembly of claim 14, wherein the mechanical retainer is releasable from the non-woven fiber polymer filter via the wellbore medium.

\* \* \* \* \*